(12) United States Patent
Wolters

(10) Patent No.: US 6,582,298 B2
(45) Date of Patent: Jun. 24, 2003

(54) VARIABLY POSITIONABLE OSCILLATING CHAFF PAN FOR AN AGRICULTURAL COMBINE

(75) Inventor: Joshua J. Wolters, Genesco, IL (US)

(73) Assignee: Case Corporation, Racine, WI (US)

( * ) Notice: Subject to any disclaimer, the term of this patent is extended or adjusted under 35 U.S.C. 154(b) by 30 days.

(21) Appl. No.: 09/996,059

(22) Filed: Nov. 28, 2001

(65) Prior Publication Data

US 2003/0100353 A1 May 29, 2003

(51) Int. Cl.⁷ ................................................. A01F 12/44
(52) U.S. Cl. ........................................ 460/97; 460/103
(58) Field of Search .......................... 460/97, 145, 147, 460/101, 102, 94, 95, 103

(56) References Cited

U.S. PATENT DOCUMENTS

| | | | | |
|---|---|---|---|---|
| 680,187 | A | * 8/1901 | Zimmerman | 209/404 |
| 1,243,284 | A | * 10/1917 | Goodman | 209/319 |
| 2,314,901 | A | 3/1943 | Scranton | 130/27 |
| 2,441,917 | A | * 5/1948 | Dion | 460/111 |
| 2,500,448 | A | 3/1950 | Bozarth | 209/416 |
| 2,500,803 | A | 3/1950 | Cockrell | 130/24 |
| 2,587,918 | A | 3/1952 | Stout | 209/416 |
| 2,626,159 | A | 1/1953 | Thompson | 275/3 |
| 2,691,444 | A | 10/1954 | Oliver | 209/416 |
| 2,762,185 | A | 9/1956 | Hyman et al. | 56/209 |
| 2,801,511 | A | 8/1957 | Vogelaar | 56/209 |
| 2,831,577 | A | 4/1958 | Farber | 209/416 |
| 2,893,558 | A | 7/1959 | Zollinger | 209/254 |
| 3,186,548 | A | 6/1965 | Stroburg | 209/416 |
| 3,670,739 | A | 6/1972 | Rowland-Hill | 130/27 |
| 3,673,779 | A | 7/1972 | Scarnato et al. | 56/503 |
| 3,712,309 | A | 1/1973 | Schmitz | 130/27 |
| 4,056,107 | A | 11/1977 | Todd et al. | 130/27 |
| 4,344,443 | A | 8/1982 | De Busscher et al. | 130/272 |
| 4,355,647 | A | 10/1982 | Heidjann et al. | 130/24 |
| 4,535,788 | A | 8/1985 | Rowland-Hill et al. | 130/27 |
| 4,548,214 | A | 10/1985 | Sheehan et al. | 130/27 |
| 4,557,276 | A | 12/1985 | Hyman et al. | 130/27 |
| 4,573,483 | A | 3/1986 | Raineri | 130/27 |
| 4,598,718 | A | 7/1986 | Glaubitz et al. | 130/27 |
| 4,614,197 | A | 9/1986 | Weber et al. | 130/27 |
| 4,669,489 | A | 6/1987 | Schraeder et al. | 130/27 |
| 4,735,216 | A | 4/1988 | Scott et al. | 130/27 |
| 4,736,753 | A | 4/1988 | Glaubitz et al. | 130/27 |
| 4,892,504 | A | 1/1990 | Scott et al. | 460/112 |
| 4,897,071 | A | 1/1990 | Desnijder et al. | 460/10 |

(List continued on next page.)

Primary Examiner—Thomas B. Will
Assistant Examiner—Meredith Petravick
(74) Attorney, Agent, or Firm—John William Stader; A. Nicholas Trausch; Rebecca L. Henkel

(57) ABSTRACT

A variably positionable chaff pan for attachment to an oscillating element of a cleaning apparatus or system of an agricultural combine for oscillation therewith for conveying chaff from the oscillating element to a non-oscillating chopper or spreader mounted to a fixed frame of the combine. The chaff pan is also sidewardly tiltable with the cleaning apparatus or system, if so capable. The chaff pan has a surface for receiving the chaff positionable in at least one operational or first position adjacent to the oscillating element of the cleaning apparatus which can be, for instance, a chaffer, a sieve, a frame or rails supporting the same, or the like, for receiving the chaff therefrom, a pivoting element for connecting the pan to the oscillating element for pivotal movement relative thereto about a generally horizontal axis through a range of positions angularly related to the oscillating element including positions oriented relative thereto for receiving the chaff therefrom, and a linkage arrangement connecting the pan to the fixed frame for supporting the pan in selected ones of the positions within the range of positions while allowing the pan to oscillate with the oscillating element relative to the linkage arrangement.

13 Claims, 4 Drawing Sheets

U.S. PATENT DOCUMENTS

| | | | |
|---|---|---|---|
| 4,968,284 A | 11/1990 | Klimmer et al. | 460/8 |
| 5,282,771 A | 2/1994 | Underwood | 460/8 |
| 5,324,231 A | 6/1994 | Van Herpe et al. | 460/106 |
| 5,338,257 A | 8/1994 | Underwood | 460/8 |
| 5,791,986 A | 8/1998 | Underwood et al. | 460/101 |
| 5,795,233 A * | 8/1998 | Eschbach et al. | 464/143 |
| 5,797,793 A | 8/1998 | Matousek et al. | 460/111 |
| 5,878,557 A | 3/1999 | Wyffels et al. | 56/13.5 |
| 6,251,009 B1 | 6/2001 | Grywacheski et al. | 460/112 |

* cited by examiner

VARIABLY POSITIONABLE OSCILLATING CHAFF PAN FOR AN AGRICULTURAL COMBINE

TECHNICAL FIELD

This invention relates generally to agricultural combines, and more particularly, to a variably positionable chaff pan for disposition rearwardly of cleaning apparatus of an agricultural combine for conveying chaff from the cleaning apparatus to a chopper and/or spreader, the pan being connected to the cleaning apparatus for oscillation therewith and being positionable and lockable in a range of deployed or operational positions for conveying the chaff, and a range of retracted or stored positions for allowing access to the cleaning apparatus and the chopper and spreader for ease of maintenance, service and inspection thereof, and also for allowing access to and use of a hitch for a header cart or the like located below the pan.

BACKGROUND ART

Currently, combines typically include a straw chopper and/or straw spreader for disposing of straw separated from the harvested crop onto the crop field. In addition, some combines have a chaff spreader for spreading the chaff separated from the grain by the cleaning apparatus or system. It is desirable to provide the chaff spreading function, however, it is also desired to eliminate the additional chaff spreader apparatus due to the cost, weight, space, and maintenance requirements thereof. One approach for eliminating the chaff spreader is to route the chaff blown and discharged by the cleaning apparatus into the straw chopper and/or straw spreader so as to be chopped and/or spread over the field thereby. This can be done by mounting the chopper and/or spreader directly behind the chaff discharge end of the cleaning apparatus. However, a shortcoming of this location is that it makes access to the cleaning apparatus for service, maintenance, and inspection difficult, which is undesirable. As an alternative, the chopper and/or spreader can be spaced rearwardly of the cleaning apparatus to provide an access space or gap therebetween for service and the like. However, this space or gap presents a problem as it must be crossed or bridged by the chaff enroute to the chopper and/or spreader. The chaff is typically carried rearwardly by a flow of air blown upwardly through the cleaning apparatus, and to enclose this space to contain the chaff containing air flow and direct it to the chopper and/or spreader, a pan or other enclosure can be used. It is known to mount such pans to the frame or other enclosures of the combine, or to the cleaning apparatus itself, and for the pan or enclosure to be foldable between an operational position and an open position. However, pans or enclosures attached to the combine frame but not to the cleaning apparatus have the disadvantage that they do not provide a continuous path from the cleaning apparatus to the chopper and/or spreader and do not vibrate or oscillate with the cleaning apparatus. Pans attached to the cleaning apparatus will oscillate therewith, but if supported only by the cleaning apparatus can place loads thereon which can degrade the operation of the cleaning system and possibly damage it. Thus, what is sought is a pan for conveying chaff to a chopper and/or spreader located spacedly behind the cleaning apparatus of a combine, that is attachable to the cleaning apparatus for vibration or oscillation therewith, but without unduly loading it, and which is easily and conveniently repositionable or movable for allowing access to the cleaning apparatus and the chopper and/or spreader.

Additionally, some combines have cleaning apparatus which are self-leveling, that is, they pivot or tilt at least sidewardly to compensate for tilting of the combine as it moves across the sides of hills and the like. Thus, it is also sought that a pan for bridging the space between the cleaning apparatus and the chopper and/or spreader be able to pivot or tilt with the cleaning apparatus.

Still further, some combines include a hitch on the rear end thereof beneath the contemplated location for any device for bridging the space between the cleaning apparatus and the chopper and/or spreader, for attaching the tongue of a header cart or the like thereto to allow towing the header cart or the like. It would thus be desirable that a chaff pan be capable of easily accommodating usage of the hitch, without interfering therewith.

SUMMARY OF THE INVENTION

What is disclosed is a variably positionable chaff pan for attachment to an oscillating element of a cleaning apparatus or system of an agricultural combine for oscillation therewith for conveying chaff from the oscillating element to a non-oscillating chopper or spreader mounted to a fixed frame of the combine, which chaff pan overcomes many of the shortcomings discussed above and which is sidewardly tiltable with the cleaning apparatus or system, if so capable. The variably positionable chaff pan has a surface for receiving the chaff positionable in at least one operational or first position adjacent to the oscillating element of the cleaning apparatus which can be, for instance, a chaffer, a sieve, a frame or rails supporting the same, or the like, for receiving the chaff therefrom, a pivoting element for connecting the pan to the oscillating element for pivotal movement relative thereto about a generally horizontal axis through a range of positions angularly related to the oscillating element including positions oriented relative thereto for receiving the chaff therefrom, and a linkage arrangement connecting the pan to the fixed frame for supporting the pan in selected ones of the positions within the range of positions while allowing the pan to oscillate with the oscillating element relative to the linkage arrangement, the linkage arrangement including a locking variable length element lockable at lengths within a range of lengths for holding the pan in the positions for receiving the chaff from the oscillating element, respectively, and unlockable such that the length can be varied to allow pivotal movement of the pan to other of the positions within the range of positions.

When the cleaning apparatus is mounted for pivotal movement relative to the frame in a sidewardly direction relative to a direction of oscillation, the linkage arrangement allows sideward movement of the pan relative thereto such that the pan can pivot sidewardly with the cleaning apparatus relative to the linkage arrangement.

DETAILED DESCRIPTION OF THE INVENTION

Figure 1:
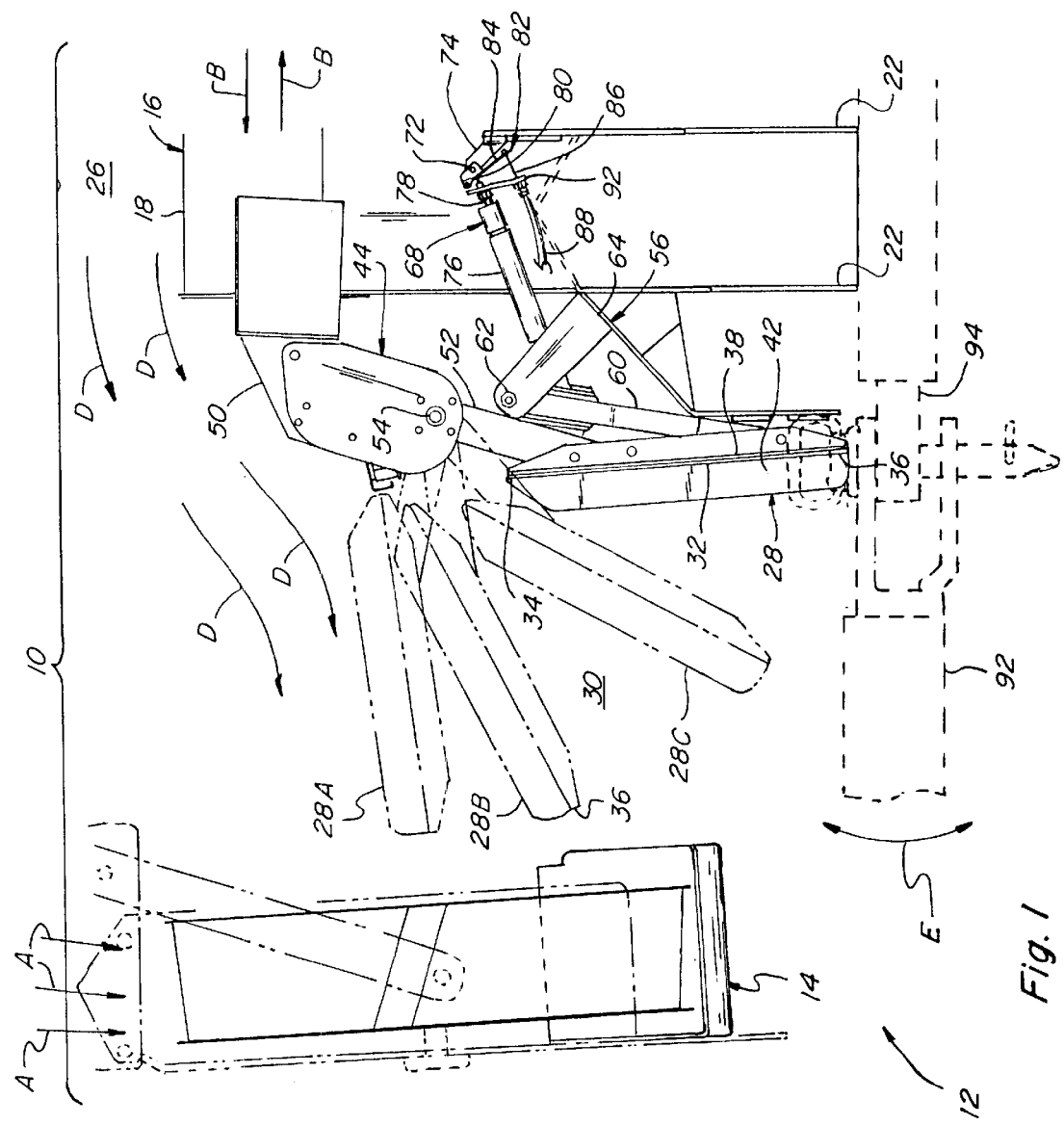
FIG. 1 is a simplified, side elevational representation of a rear end of an agricultural combine including a variably positionable oscillating chaff pan according to the present invention, the chaff pan being shown in solid lines in a stored or folded position and in phantom in several other positions within a range of pivotal positions thereof including two operational positions for directing an outflow of chaff from a cleaning apparatus or system of the combine into a rotary straw chopper and/or spreader of the combine.

Referring now to the drawings, wherein a preferred embodiment of the present invention is shown, in FIGS. 1, 2, 3, and 4, a rear end 10 of a self-propelled agricultural combine 12 is shown, including a rearwardly located rotary device 14 representative of a device for chopping and/or spreading straw, stalks, and other crop residue and trash that has been separated from the grain of the crops by a threshing mechanism (not shown) of combine 12 located forwardly of rear end 10 in the well known manner. The straw, stalks and the like are propelled rearwardly by a rotating beater or the like (not shown), as denoted by arrows A, to rotary device 14 for chopping and/or spreading thereby. After separation from the straw, stalks, and other residue and trash, the grain is then separated from chaff by cleaning apparatus 16 including at least one generally horizontal chaffer or sieve (not shown) supported on front-to-rear extending chaffer rails 18 and 20 (FIG. 3) located on opposite sides of the chaffer or sieve, the chaffer or sieve including apertures therethrough adjustable in size for allowing passage of grains of a selected maximum size therethrough, while preventing the larger chaff from passing therethrough, for separating the grain from the chaff in the well known conventional manner. Cleaning apparatus 16 is oscillated in one or more generally horizontal directions, as denoted by arrows B, by oscillating apparatus (not shown) to facilitate the separation of the grain from the chaff, also in the well known conventional manner.

Cleaning apparatus 16 of combine 12 can be supported for pivotal movement by a combine frame 22 about a front to rear pivotal axis, such as pivotal axis 24 shown, as denoted by arrows C, such that cleaning apparatus 16, including the chaffer or sieves, can be oriented substantially horizontally while combine frame 22 is tilted at an angle to horizontal, for instance as combine 12 is moving along a hillside or the like. After separation from the grain, the chaff is discharged and carried from cleaning apparatus 16 by a flow of air, denoted by arrows D through a rearwardly facing exhaust opening 26. In the past, the chaff discharged through exhaust opening 26 would have been deposited on the ground behind combine 12, in a swath or residue path corresponding approximately to the width of opening 26.

In the present instance, instead of being deposited on the ground, the flow of air containing the chaff can be directed into rotary device 14 for chopping and/or spreading thereby, by a chaff pan 28 constructed and operable according to the teachings of the present invention. Chaff pan 28 is preferably attached or mounted to chaff rails 18 and 20 of cleaning apparatus 16 so as to oscillate therewith and importantly so as to be pivotable relative thereto through a predetermined range of positions as best shown in FIG. 1, including several operating positions as represented at 28A and 28B oriented generally horizontally or at a small acute angle to horizontal for directing the flow of chaff as represented by arrows D toward rotary device 14, and stored or folded positions as represented at 28 and 28C oriented generally vertically or at a small acute angle to vertical beneath the operational positions to provide a gap or space 30 rearwardly of pan 28. Space 30 is sufficiently large for a person to stand in while inspecting or accessing cleaning apparatus 16 through opening 26 for maintenance, repair, and/or cleaning. Space 30 also provides better and easier access to rotary device 14. Chaff pan 28 includes a generally planar pan surface 32 having a front edge 34, an opposite rear edge 36, and sides 38 and 40 extending between front and rear edges 34 and 36, each side 38, 40 including an upwardly extending angled chaff guide 42 for directing chaff moving along surface 32, as denoted by arrows D, into device 14.

Chaff pan 28 is shown pivotally connected to chaffer rails 18, 20 of cleaning apparatus 16 by a pair of pivot joints 44 and 46 for pivotal movement relative thereto about a generally horizontal axis 48 through the predetermined range of pivotal positions. Pivot joints 44, 46 each include an L shape bracket 50 fixedly connected to the chaffer rail 18 or 20, an arm 52 fixedly connected to side 38 or 40 of pan 28, and a pin 54 pivotally connecting bracket 50 and arm 52. To support pan 28 in a selected operational position while at the same time allowing pan 28 the freedom to oscillate with chaffer rails 18, 20, a linkage arrangement 56 pivotally supports pan 28. Linkage arrangement 56 includes a shaker arm 58 pivotally connected at one end thereof to a central portion of pan 28 and at an opposite end to a free end of a lever arm 60 having an opposite end pivotally connected to frame 22 by a lever arm pivot 62 located on a lever arm bracket 64 fixedly mounted to frame 22.

Because cleaning apparatus 16 can be pivoted sidewardly about axis 24 as denoted by arrows C (FIG. 3) as well as oscillated frontwardly and rearwardly as denoted by arrows B (FIG. 1), it is desired that pan 28 be pivotable with the cleaning apparatus so as to be movable in both of those directions relative to lever arm 60 at least while being supported in the operational positions such as represented at 28A and 28B. To accommodate this, shaker arm 58 is located at about the middle of pan 28 in the side-to-side direction generally coincident with axis 24 (FIG. 3) and preferably includes spherical or ball rod end bearings or pivot joints 66 on the opposite ends thereof pivotally connecting shaker arm 58 to pan 28 and lever arm 60.

Figure 2:
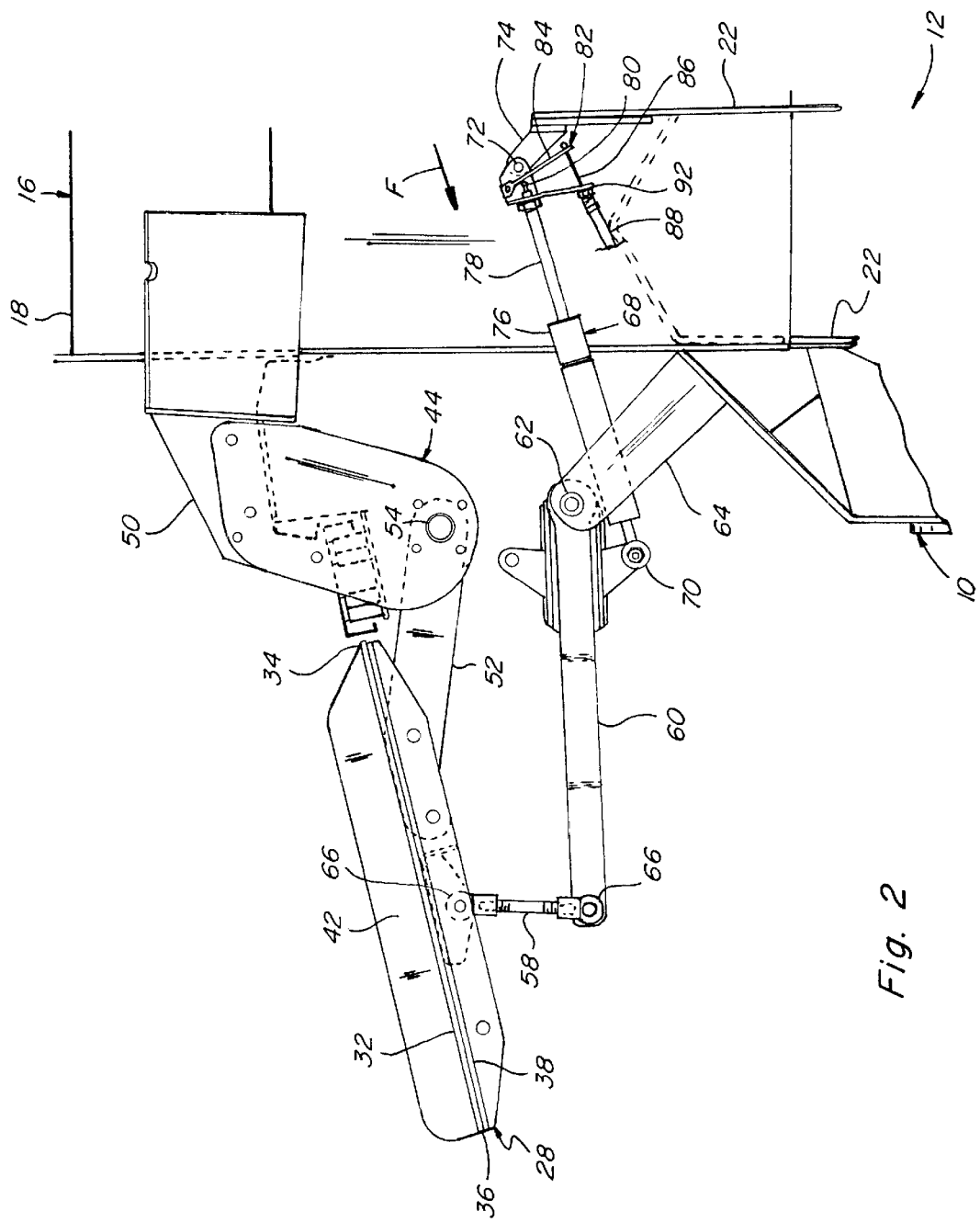
FIG. 2 is an enlarged side elevational view of the rear end of the cleaning system of FIG. 1 showing the variably positionable oscillating chaff pan in one of the operational positions thereof.

A variable length element 68, lockable at selected lengths within a predetermined range of lengths thereof, is pivotally connected at a pivot 70 to lever arm 60 and at a pivot 72 to lever arm pivot bracket 64 on frame 24 in position for supporting pan 28 through lever arm 60 and shaker arm 58. Element 68 preferably comprises, but is not limited to, a conventionally constructed and operable locking gas spring such as available from Stabilus Company of Germany under the name BLOC-O-LIFT, including a cylinder 76 connected to pivot 70 which telescopically receives a rod 78. Rod 78 carries a piston including a gas conduit therethrough (not shown) which can be selectably opened and closed by moving an actuator 80 which extends through rod 78 from the end thereof opposite cylinder 76. In this instance, actuator 80 opens the conduit when a force as denoted at F in FIG. 2 is applied to the actuator in a direction longitudinally toward cylinder 76 to allow gas flow through the piston such that the piston and rod 78 can be moved with reduced resistance within cylinder 76. Actuator 80 is urged in the opposite direction by an internal spring (also not shown) and thus when the force F is removed or reduced sufficiently actuator 80 will close to lock or fix rod 78 in its current position within cylinder 76. To enable an operator to more easily actuate element 68, a remote control device 82 is provided, including an actuating lever 84 pivotally mounted to bracket 74 in position to be pivoted in the direction toward cylinder 76 and against actuator 80 for unlocking element 68. An actuating cable is provided having one end connected to lever 84, and extending through a sheath 88 to an opposite end including a handle 90 located adjacent to a side of combine frame 22 beside pan 28. Sheath 88 is retained or held at both opposite ends thereof by mounting brackets 92 such that when handle 90 is pulled cable 86 will pull lever 84 against actuator 80 to unlock element 68. With element 68 unlocked, pan 28 can be grasped and pivoted about pivot joints 44, 46, or allowed to drop under force of gravity while arms 58 and 60 are pivoted one relative to the other, to move pan 28 to any desired position within the predetermined range, including at any of the positions represented at 28A, 28B, and 28C. Then, when pan 28 is positioned as desired, handle 90 can be released to lock element 68 such that it will hold arms 58 and 60 in their respective positions and relationship one relative to the other for supporting and holding pan 28 in the desired position. In any selected position, due to the pivotal connection of shaker arm 58 to pan 28 and lever arm 60, pan 28 will be allowed to oscillate with cleaning apparatus 16. When in an operational position such as shown at 28A and 28B, pan 28 will effectively convey chaff which is deposited thereon or comes in contact therewith rearwardly to a rotary device, such as device 14, located rearwardly thereof. When in a lowered position such as shown at 28 or 28C, access to cleaning apparatus 16 and device 14 through space 30 is direct and easy.

An advantage of the capability to position pan 28 in a range of operational positions such as represented at 28A and 28B is that the conveyance of the chaff to the rotary device can be varied or optimized. For example, under some conditions, it may be desirable to allow some of the chaff to fall between pan 28 and the rotary device to the ground in the middle of the path of movement of combine 12. Also, it may be desirable to direct the chaff into a particular location on the rotary device such as below chopping or cutting knives thereof (not shown) such that, for instance, the chaff entering the device is not chopped but is spread, whereas the straw and other trash entering the device (arrows A in FIG. 1) is both chopped and spread. Further in this regard, it should be noted that although here pan surface 32 is shown as being flat and including only chaff guides 42 for conveying the chaff to the rotary device, surface 32 can alternatively have other characteristics and elements for facilitating conveyance of the chaff, such as a rearwardly and downwardly extending steps, stepped chaff guides, chaff guides positioned for directing the chaff to particular locations in the side-to-side direction on the rotary device, or the like.

Figure 3:
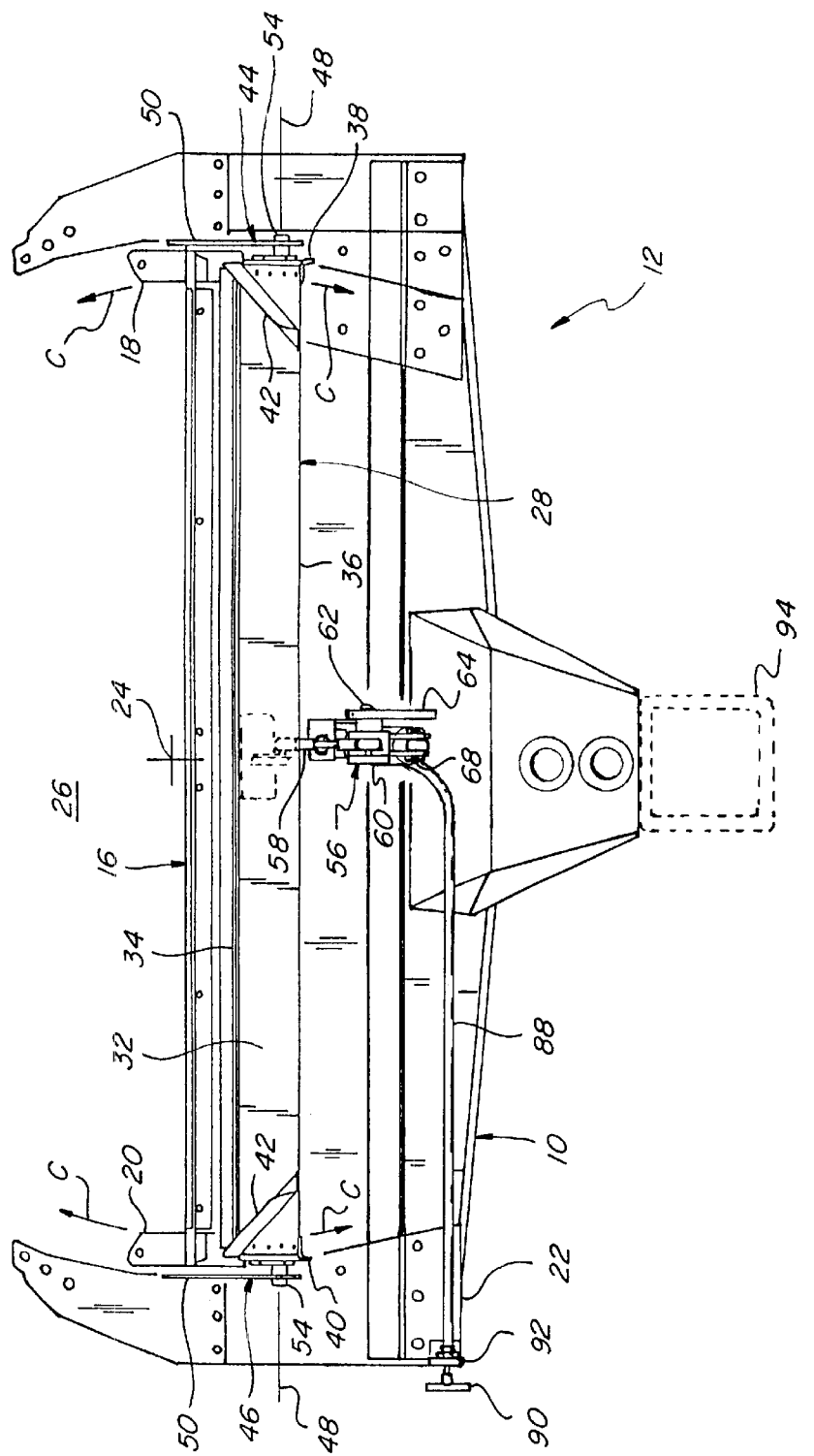
FIG. 3 is a simplified rear elevational view of the cleaning system or apparatus and chaff pan of FIG. 1.
Figure 4:
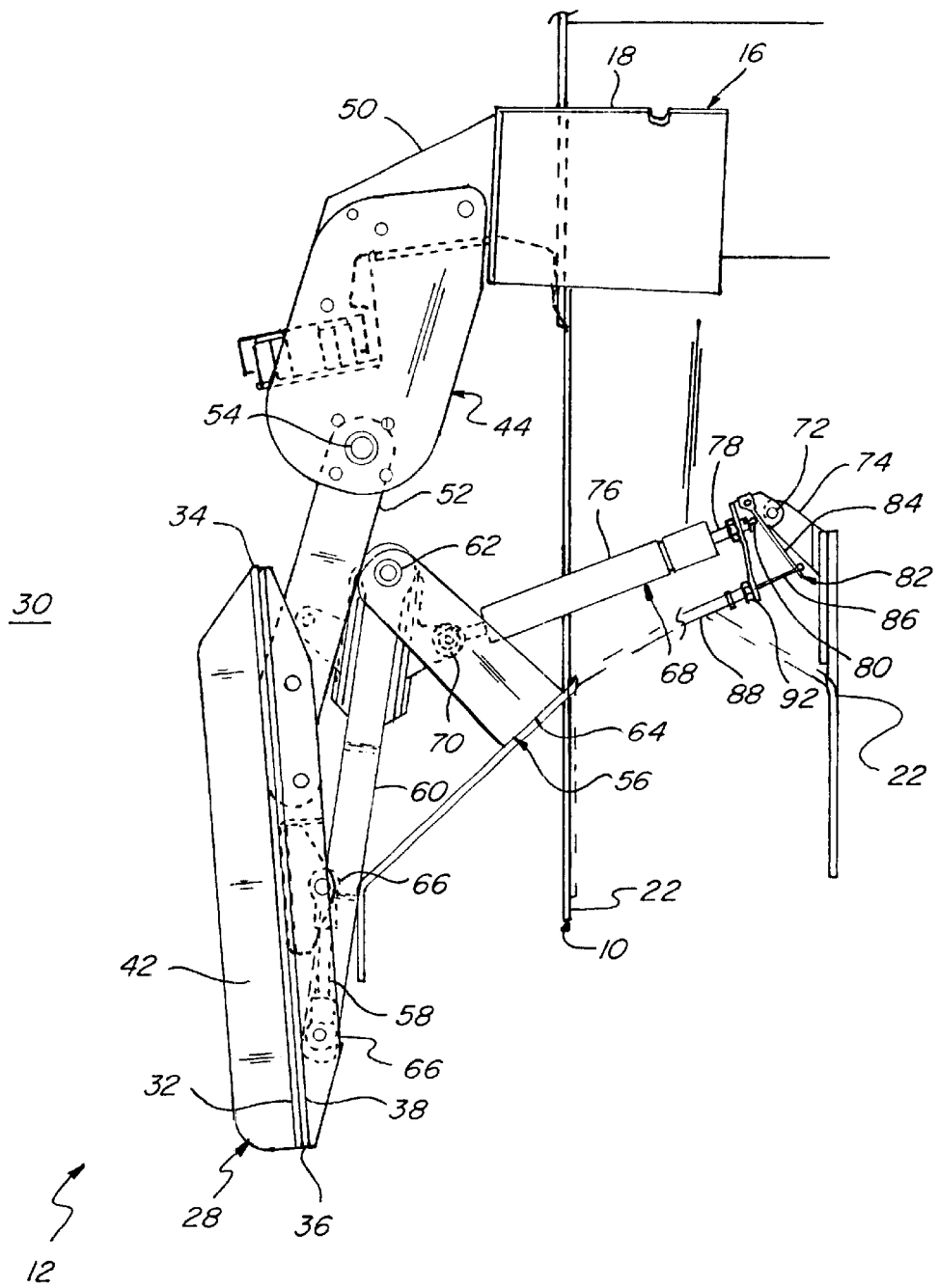
FIG. 4 is an enlarged side elevational view of the cleaning apparatus and chaff pan of FIG. 1 in one of the stored positions.

Referring in particular to FIGS. 1 and 3, addressing the range of stored or non-operational positions of chaff pan 28, an advantage of such positions such as shown at 28C is that pan 28 is elevated sufficiently so as not to interfere with the hitching of devices such as a tongue 92 of a header cart or the like (not shown) to an optional hitch 94 mounted to frame 22 or elsewhere on rear end 10 of combine 12 beneath cleaning apparatus 16, or the articulation of the tongue or other device about the hitch, as represented by arrow E.

An advantage of connecting pan 28 to cleaning apparatus for oscillation therewith while supporting pan 28 largely on frame 22 via linkage arrangement 56 is that less loading of the cleaning apparatus and the oscillating apparatus results, such that the cleaning apparatus has been found to operate better and more efficiently, with less occurrence of breakage of parts thereof due to overloading.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A variably positionable chaff pan for attachment to an oscillating element of cleaning apparatus of an agricultural combine for oscillation therewith for conveying chaff from the oscillating element to a non-oscillating chopper or spreader mounted to a fixed frame of the combine, comprising:

a pan having a surface for receiving the chaff positionable adjacent to the oscillating element of the cleaning apparatus for receiving the chaff therefrom;

a pivoting element for connecting the can to the oscillating element for pivotal movement relative thereto about a generally horizontal axis through a range of positions angularly related to the oscillating element including positions oriented relative thereto for receiving the chaff therefrom; and a linkage arrangement connecting the pan to the fixed frame for supporting the pan in selected ones of the positions within the range of positions while allowing the pan to oscillate with the oscillating element relative to the linkage arrangement, the linkage arrangement including a locking variable length element lockable a lengths within a range of lengths for holding the pan in the positions for receiving the chaff from the oscillating element, respectively, and unlockable such that the length can be varied to allow pivotal movement of the pan to other of the positions within the range of positions, wherein the locking variable length element supports a lever arm pivotally connected to the fixed frame and to the pan.

2. The variably positionable chaff pan of claim 1, wherein the cleaning apparatus is mounted for pivotal movement relative to the frame in a transverse direction relative to a direction of the oscillation, and the linkage arrangement allows the pan to move with the cleaning apparatus in the transverse direction relative to the frame.

3. The variably positionable chaff pan of claim 1, wherein the locking variable length element comprises a locking gas spring.

4. The variably positionable chaff pan of claim 3, wherein the locking gas spring is located generally centrally with respect to the pan in a sideward direction and includes an actuator movable in one direction for unlocking the gas spring and in a second direction for locking the gas spring, and a remote control device connected to the actuator and located remotely therefrom, the remote control device being operable for moving the actuator in the first and second directions for unlocking and locking the gas spring.

5. The variably positionable chaff pan of claim 1, wherein the range of positions angularly related to the oscillating element includes generally horizontal positions and generally vertical positions.

6. A chaff pan connected to cleaning apparatus mounted for oscillating movement relative to a frame of an agricultural combine for receiving chaff from the cleaning apparatus and conveying the chaff to a chopper or spreader, the chaff pan comprising:

a pivot joint connecting the pan to the cleaning apparatus for oscillating movement with the cleaning apparatus, the pivot joint allowing pivotal movement of the pan relative to the cleaning apparatus about a generally horizontal pivotal axis through a predetermined range of pivotal positions;

a first arm pivotally connected to the pan;

a second arm pivotally connected to the frame and to the first arm; and a locking variable length element connected between the second arm and the frame, the variable length element being unlockable to allow varying the length thereof within a predetermined range of lengths for pivotally moving the first and second arms to move the pan through the range of pivotal positions, the variable length element being lockable at any selected length within the range of lengths for holding the first and second arms in position for supporting the pan at a pivotal position corresponding to the selected length.

7. The chaff pan of claim 6, wherein the cleaning apparatus is mounted for pivotal movement relative to the frame and the first arm allows pivotal movement of the pan with the cleaning apparatus relative to the second arm.

8. The chaff pan of claim 6, wherein the variable length element comprises a locking gas spring.

9. The chaff pan of claim 8, wherein the gas spring includes an actuator movable for unlocking the gas spring to allow varying the length thereof, and a remote control connected to the actuator and located at a location spaced from the gas spring to allow unlocking the gas spring from the location.

10. The chaff pan of claim 6, wherein the range of pivotal positions comprises positions oriented generally parallel to the cleaning apparatus and generally vertical positions.

11. A variably positionable chaff pan connected to cleaning apparatus mounted for oscillating movement relative to a frame of an agricultural combine for receiving chaff from the cleaning apparatus and conveying the chaff to a chopper or spreader, the chaff pan comprising:

a pivot joint connecting the pan to the cleaning apparatus for oscillating movement with the cleaning apparatus, the pivot joint allowing pivotal movement of the pan relative to the cleaning apparatus about a generally horizontal pivotal axis through a predetermined range of pivotal positions including generally horizontal operating positions and folded positions which are generally vertical or at a small acute angle to vertical;

a first arm pivotally connected to the pan;

a second arm pivotally connected to the frame and to the first arm, the first and second arms being pivotable one relative to the other for pivoting the pan relative to the cleaning apparatus through the range of pivotal positions; and a locking gas spring pivotally connected between the second arm and the frame and variable in length within a predetermined range of lengths when unlocked to allow relatively pivoting the first and second arms for pivoting the pan through the range of pivotal positions, the gas spring being lockable at any selected one of the lengths for holding the pan in a corresponding pivotal position within the range of pivotal positions.

12. The chaff pan of claim 11, wherein the range of pivotal positions includes operating positions which are generally horizontal or oriented at small acute angles to horizontal and non-operating positions which are generally vertical or oriented at small acute angles to vertical.

13. The chaff pan of claim 11, wherein the cleaning apparatus is mounted for pivotal movement relative to the frame in a transverse direction relative to a direction of the oscillating movement, and the first arm allows the pan to pivot with the cleaning apparatus in the transverse direction.

* * * * *